United States Patent
Prescott et al.

(10) Patent No.: US 7,694,183 B2
(45) Date of Patent: *Apr. 6, 2010

(54) CONTROLLING SOFTWARE FAILURE DATA REPORTING AND RESPONSES

(75) Inventors: Allen K. Prescott, Seattle, WA (US); Shanti P. Punukollu, Redmond, WA (US); Su Chin Chang, Woodinville, WA (US); Ted E. Dinklocker, Sammamish, WA (US); Komal Kashiramka, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 60 days.

This patent is subject to a terminal disclaimer.

(21) Appl. No.: 12/118,694

(22) Filed: May 10, 2008

(65) Prior Publication Data

US 2008/0215932 A1    Sep. 4, 2008

Related U.S. Application Data

(63) Continuation of application No. 11/005,386, filed on Dec. 6, 2004, now Pat. No. 7,380,171.

(51) Int. Cl.
   *G06F 11/00*    (2006.01)
(52) U.S. Cl. .......................... 714/38; 714/48; 719/318
(58) Field of Classification Search ............... None
   See application file for complete search history.

(56) References Cited

U.S. PATENT DOCUMENTS

| | | | |
|---|---|---|---|
| 6,363,503 B1 | 3/2002 | Clauss et al. | |
| 6,438,618 B1 | 8/2002 | Lortz | |
| 6,536,000 B1 | 3/2003 | Jackson | |
| 6,615,376 B1 | 9/2003 | Lin | |
| 6,629,267 B1 | 9/2003 | Glerum | |
| 6,665,824 B1 | 12/2003 | Ruhlen | |
| 6,708,333 B1 | 3/2004 | Glerum | |
| 6,785,848 B1 | 8/2004 | Glerum | |
| 7,003,779 B2 | 2/2006 | Riosa | |
| 7,062,681 B2 | 6/2006 | Larsson | |
| 7,210,123 B2 | 4/2007 | Makiyama | |
| 2003/0028825 A1 | 2/2003 | Hines | |
| 2004/0006652 A1 | 1/2004 | Prall | |

(Continued)

OTHER PUBLICATIONS

U.S. Appl. No. 12/118,695, filed May 10, 2008, Prescott.

(Continued)

*Primary Examiner*—Yolanda L Wilson
(74) *Attorney, Agent, or Firm*—Workman Nydegger

(57) ABSTRACT

User input defines transmission filter rules to be met when sending an error report to a support provider. User input also defines collection filter rules to be met when including failure data within an error report. Error reports corresponding to crash failures at clients are filtered with the transmission filter rules to determine which of the error reports to send to the support provider, and each error report to be sent to the support provider is further filtered to remove any failure data that fails to satisfy the collection filter rules. Each error report that satisfies the transmission filter rules, along with the failure data satisfying the collection filter rules, is sent to the support provider for analysis. Standard and or custom failure responses corresponding to the failures at the clients may be retrieved and sent to the clients in accordance with the collection filter rules.

21 Claims, 9 Drawing Sheets

U.S. PATENT DOCUMENTS

2004/0153821 A1   8/2004   Kuhmann
2004/0205142 A1   10/2004  Bahr
2005/0081108 A1   4/2005   Shabalin

OTHER PUBLICATIONS

U.S. Appl. No. 12/127,742, filed May 27, 2008, Prescott.
U.S. Appl. No. 12/127,751, filed May 27, 2008, Prescott.
Office Action dated Aug. 29, 2007 cited in related U.S. Appl. No. 11/005,386.
Notice of Allowance dated Feb. 19, 2008 cited in U.S. Appl. No. 11/005,386.
Office Action dated Sep. 8, 2009 cited in U.S. Appl. No. 12/118,695.
Office Action dated Sep. 7, 2009 cited in U.S. Appl. No. 12/127,742.
Office Action dated Sep. 15, 2009 cited in U.S. Appl. No. 12/127,751.

CONTROLLING SOFTWARE FAILURE DATA REPORTING AND RESPONSES

CROSS-REFERENCE TO RELATED APPLICATIONS

The present application is a continuation of, and claims priority to U.S. patent application Ser. No. 11/005,386, which was filed Dec. 6, 2004 and entitled "Controlling Software Failure Data Reporting and Responses." The foregoing application is incorporated herein by reference in its entirety.

BACKGROUND OF THE INVENTION

1. The Field of the Invention

The present invention relates to software failures. More specifically, the present invention relates to controlling software failure data reporting for use in determining the cause of a software failure, and to controlling software failure data responses.

2. Background and Related Art

Prior to being released to consumers, software generally undergoes a significant amount of testing to identify and correct failures. One type of failure is a crash, in which executing software terminates. The executing software may be an application, an application component, the operating system, an operating system component, etc. Crashes can be frustrating to users because generally they have some impact on productivity. In some cases, not only must the operating system or application be restarted, but recently completed work also may need to be repeated because it was lost during the crash.

Another type of failure is a setup failure. Setup failures occur during installation of a program module onto a user's computer. Setup failures may prevent certain aspects of the program module, or even an entire application, from being installed on the user's computer.

Software failures also tend to create a significant amount of work for the product support personnel who are tasked with diagnosing and solving the problem that led to the failure, often with a rather limited amount of information received from a user over the telephone. In the past, although there may have been a significant amount of information on the user's computer that could be useful to product support personnel or software developers in diagnosing the failure, without being physically present at the user's computer, this information has not been extracted and analyzed in as useful a fashion as possible.

Recently, however, techniques for gathering information about a failure at a client computer have been explored. While gathering failure data has been helpful in diagnosing the cause of failures, including crashes, setup failures, etc., certain problems with traditional approaches have not been addressed adequately. For example, current techniques generally do not sufficiently account for privacy considerations. In some cases privacy considerations may involve proprietary information that a business is unwilling to share outside of its organization. Privacy considerations also may involve government regulations for certain financial or medical information, or simply may reflect a desire to safeguard personal information, such as in an effort to prevent identity theft or other fraudulent uses of personal information. Whatever the motivation, there now is a need to control software failure data reporting.

Another problem with traditional approaches relates to software failure data responses. Once the cause of a failure has been diagnosed, a fix or workaround may be sent to the client. The response may take the form of instructions or a software update or a combination of both to correct or avoid the failure. Naturally, different organizations have different levels of sophistication, and typically have different and conflicting policies with respect to software failure data responses.

On the other hand, it may be necessary to request additional information from a client in order to make a diagnosis. In addition to the potential privacy considerations identified above, traditional approaches have not permitted organizations a sufficient amount of control with respect to software failure data responses that request additional information. As a result, some responses simply may not be appropriate for certain organizations.

Traditional approaches also have failed to offer scalable implementations. Among other things, traditional approaches have overloaded individual processes with otherwise independent tasks and have failed to take advantage of database technologies that offer improved performance, creating various processing bottlenecks. Furthermore, without the abilities to customize as discussed above, extra processing must be performed where none is needed, wasting valuable computing resources. Accordingly, for relatively large customers with many clients, limited customization options have caused failure data reporting and failure data responses to impose a fairly significant burden, at least some of which may be unnecessary.

BRIEF SUMMARY OF THE INVENTION

The present invention relates to controlling software failure data reporting and responses. In accordance with an example embodiment, user input defines one or more transmission filter rules to be met when sending an error report to a support provider and one or more collection filter rules to be met when including failure data within an error report. One or more error reports corresponding to one or more software failures at one or more clients are filtered with the one or more transmission filter rules to determine which of the received error reports to send to the support provider, and each error report to be sent to the support provider is further filtered to remove any failure data that fails to satisfy the one or more collection filter rules. Each error report that satisfied the one or more transmission filter rules, along with the failure data satisfying the one or more collection filter rules, is sent to the support provider for analysis.

Depending of the particular error report, the one or more transmission filter rules may comprise an application name, a module name, a user name, a machine name, a generic event type, a failure error type (a simple error report type for uploading data from one or more applications, or a kernel mode error report type that includes a system error report, an application compatibility error report, a shutdown error report, a setup error report, or a bluescreen error report). The one or more collection filter rules may allow for at least one of a memory dump, application compatibility information, operating system version information, registry information, hardware configuration information, or client file information, to be included, for example, in a cabinet file, as described in greater detail below. Both the transmission filter rules and the collection filter rules may take the form of an allow/deny list (i.e., a list of rules that if met either allow or deny transmission or collection).

Each error report may comprise a failure signature that identified a program location where the failure occurred. Accordingly, the one or more transmission filter rules may comprise an indicator to send only the failure signature for each error report that satisfies the one or more transmission filter rules.

The error reports corresponding to the one or more failures may be received from the one or more client systems and status information for each error report may be maintained. The status information may include a queued for transmission filtering status, an unreported status, and queued for transmission status, a retry status, or a reported status.

One or more failure responses corresponding to the one or more failures at the one or more clients may be retrieved and sent to the one or more clients. One or more standard failure responses may be received from the support provider, or user input that defines one or more custom failure responses at the failure data management server may be received. The one or more custom failure responses may be published to the support provider for use by one or more other failure data management servers.

The one or more failure responses may comprise one or more requests for additional information or may comprise one or more fixes for the one or more failures at the one or more clients. The one or more fixes may comprise one or more instructions indicating how to prevent the one or more failures or may comprise one or more software updates that prevent the one or more failures from occurring.

User input defining various configuration parameters may be received, including user input that defines an interval for collecting any new error reports, user input that defines an interval for transmitting new error reports to the support provider for analysis, user input that defines a cabinet file persistence count for a single failure signature, etc.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE PREFERRED EMBODIMENTS

The present invention relates to methods, systems, and computer program products for controlling software failure data reporting and responses. The embodiments of the present invention may comprise one or more special purpose and/or one or more general purpose computers including various computer hardware, as discussed in greater detail below.

Figure 1:
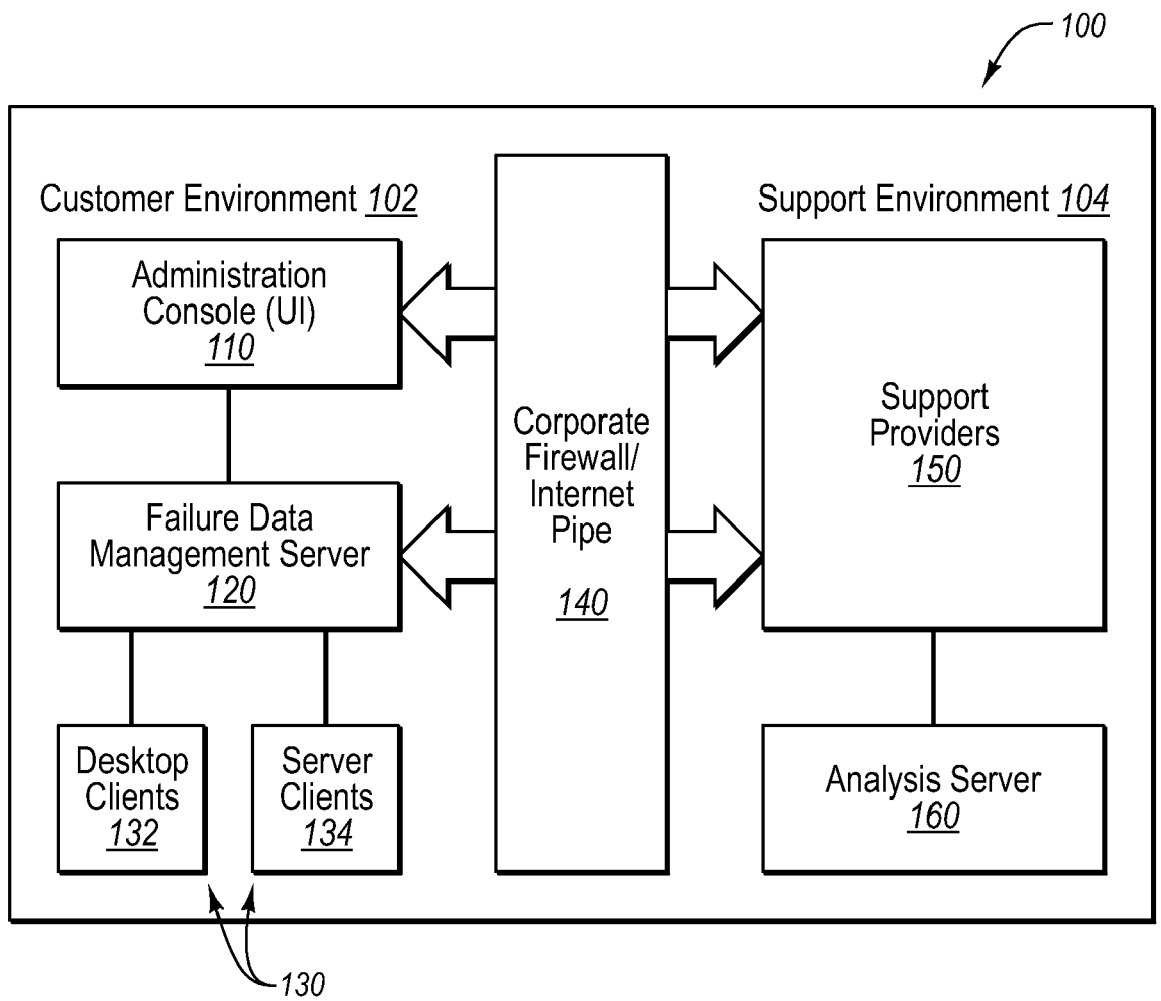
FIG. 1 is a high-level block diagram of an example failure data reporting and response system in accordance with the present invention.

FIG. 1 is a high-level block diagram of an example failure data reporting and response system 100 in accordance with the present invention. Desktop clients 132 and server clients 134 are examples of clients 130 executing software, such as application software, operating system software, services, and the like.

Figure 2:
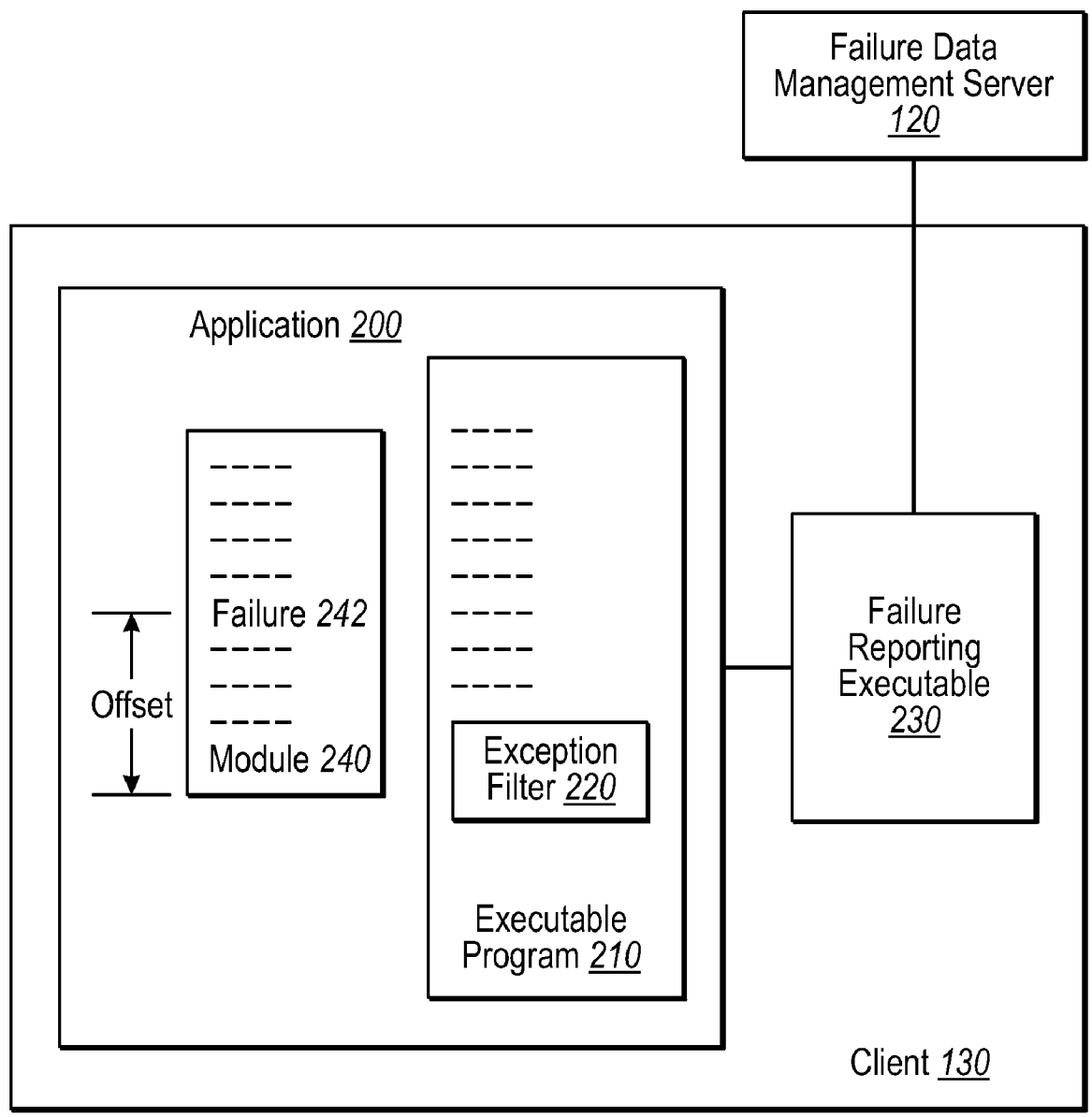
FIG. 2 shows a block diagram providing additional detail for the example client 130 in accordance with the present invention.

FIG. 2 shows a block diagram providing additional detail for an example client 130 that reports a software failure in accordance with the present invention. The client 130 comprises an application program module 200, such as a word processor program module. The client further comprises an executable program 210 running inside of application 200. An executable program is a program that can be run and typically denotes a compiled program translated into machine code in a format that can be loaded into memory and run by a computer's processor. The lines of code in executable program 210 are illustrated as dashed lines in FIG. 2.

The client 130 further comprises a module 240 being executed by the executable program 210 inside the application 200 at the time of the failure. For example, the module 240 may be a dynamic-link library. The lines of code in module 240 also are illustrated as dashed lines in FIG. 2.

In addition to the foregoing, client 130 comprises an exception filter 220. Exception filters are well-known in the art and may be registered by program modules when the operating system 635 (see FIG. 6, below) is started. When a failure (an exception) occurs, the exception filter 220 code is executed. For example, suppose a failure occurs while executable program 210 is executing instructions in module 240 at location 242. If executable program 210 has registered exception filter 220 with the operating system, then the exception filter 220 is executed when executable program 210 encounters the exception.

In client 130, exception filter 220 executes a failure reporting executable 230. The failure reporting executable 230 is an executable program comprising instructions to communicate between the application 200 and failure data management server 120. The communication between the failure reporting executable 230, the application 200 and failure data management server 120 is described in more detail below with respect to FIGS. 3 and 4A-4B. Failure reporting executable 230 preferably is separate from the application 200 because of possible instability in application 200 after having experienced a failure.

The failure reporting executable 230 determines the type of failure that has occurred and determines how the failure should be categorized. Based on the type of failure, the failure reporting executable 230 determines what relevant information to retrieve from the application program module to uniquely identify the failure. In many cases, uniquely identifying the failure denotes determining the location of the failure within executing software, such as within executable program 210. Typically this location information is sent to the failure data management server 120 as one or more parameters within a bucket.

A bucket includes a set of information uniquely defining the type of error or event being reports, such as the location of a software failure, the success or failure of an installation or setup procedure, etc. If a bucket from one failure or event matches a bucket from another failure or event, then it is presumed that both failures or events have the same cause. Although not always accurate (for example, in the case of a software failure, more than one bug may be at the same location), this presumption allows for effective organization within the failure data management server 120 and support providers 150.

The information in a bucket may be different depending on the type of failure. In an example implementation, for a crash failure, the bucket includes the name of the executable where the crash occurred, the executable module's version number, the name of the module containing the crashing instruction, the module's version number, and an offset into the crashing modules or address of the crashing instruction. For a setup failure, the bucket may include a product code of the application program module being installed, a product version of the application program module being installed, a last action performed during setup before the failure, and various error fields which depend on the particular error that occurred Clients 130 are capable of communicating failure data to both failure data management server 120 within customer environment 102 and directly to support providers 150 and analysis server 160 in support environment 104. However, because failure data management server 120 is responsible for controlling failure data reporting and responses, direct communication between clients 130 and support providers 150 and analysis server 160 is not discussed in detail.

For the example failure data reporting and response system 100 illustrated in FIG. 1, the failure data management server 120 is operated locally within customer environment 102. For example, a corporation may not allow their employees to have Internet access or a corporation may not want their employees reporting failures directly to an outside software manufacturer, potentially divulging sensitive corporate information. When the failure data management server 120 is a local corporate server and is configured to do so, error reports are uploaded to the support providers 150 and analysis server 160 in support environment 104 over corporate firewall/Internet pipe 140 so that the failures being experienced by the corporation may be corrected.

Failure data management server 120 receives failure data in the form of error reports from clients 130 and processes the failure data in accordance with policies set through the administration console 110, as described in greater detail below. One aspect of this processing is sending appropriate failure data to the support providers 150 and analysis server 160 through corporate firewall/Internet pipe 140. It should be understood that the network connections shown are examples only and other types of communication links between computers may be used. Failure data management server 120 stores failure data that is not sent to support providers 150 and analysis server 160 for local reporting through the administration console 110.

Another aspect of this processing is extracting, aggregating, and storing error reports. Some of the aggregated data is sent to support providers 150 on a regular schedule for further analysis and reporting, and some is stored only locally as controlled through administration console 110. Scheduled processing in one way in which the present invention improves scalability.

Responses to the error reports are sent to clients 130 through failure data management server 120. Responses may come from support providers 150 (public responses) through corporate firewall/Internet pipe 140, other failure data management servers (custom public responses) through corporate firewall/Internet pipe 140, or directly from failure data management server 120 (custom private responses). The failure data management server 120 plays a role in storing and forwarding responses to clients 130 and provides control over which responses the clients in the organization receive.

The administration console 110 communicates with the failure data management server 120 to setup configuration, transmission, and collection rules and to produce reports of unreported and reported failure data. The administration console also may communicate directly with the support providers 150 in order to gather aggregated information to combine with local data and make service configuration changes specific to their organization. For example, it may be useful to collect aggregated data about other corporations for comparative purposes, such a helping an administrator to determine if his/her desktops are experiencing greater or fewer failures than other similar organizations. It should be noted that the administration console 110 also provides for manually processing failure data and/or responses, if effect allowing an administrator to override configuration, transmission, and collection settings.

Figure 3:
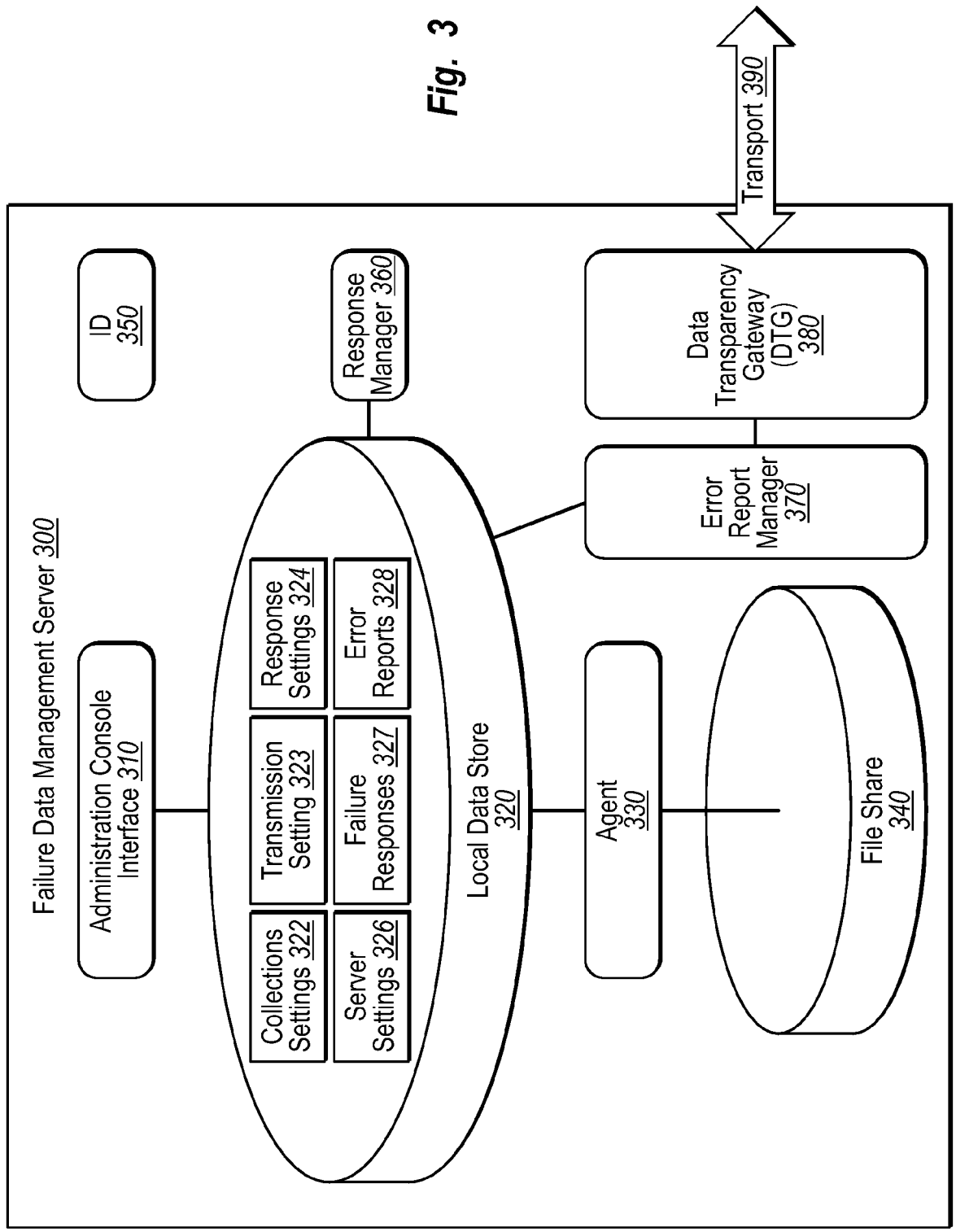
FIG. 3 shows an architectural overview for an example failure data management server.
Figure 4A:
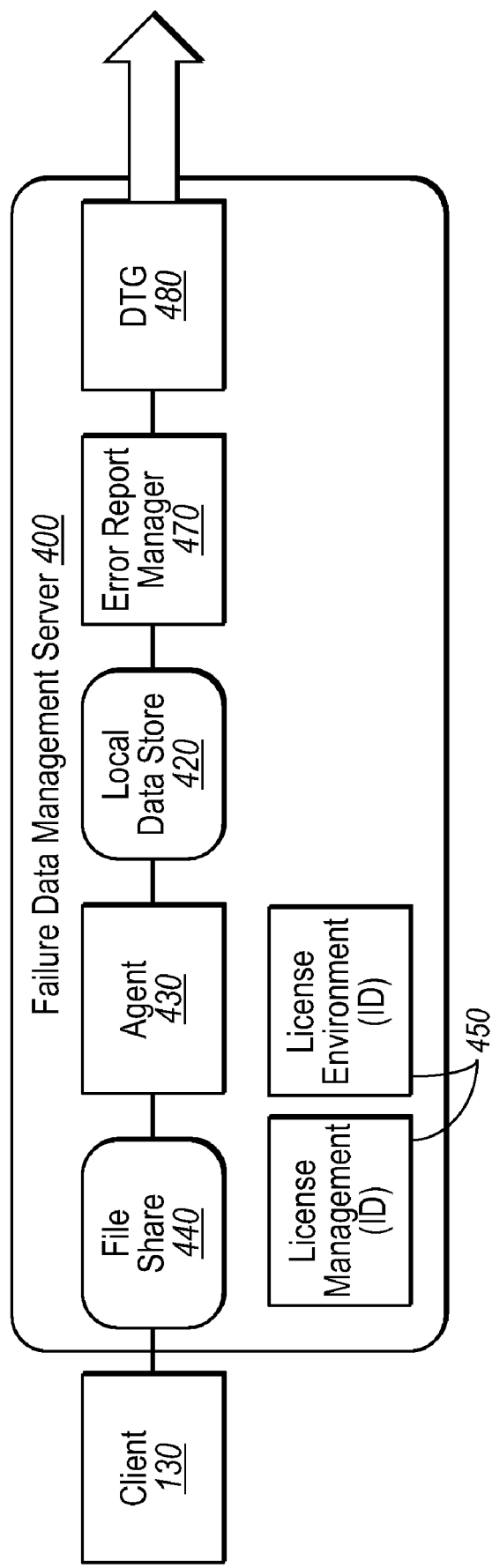
FIGS. 4A-4B illustrate logical data flows through an example failure data management server.
Figure 4B:
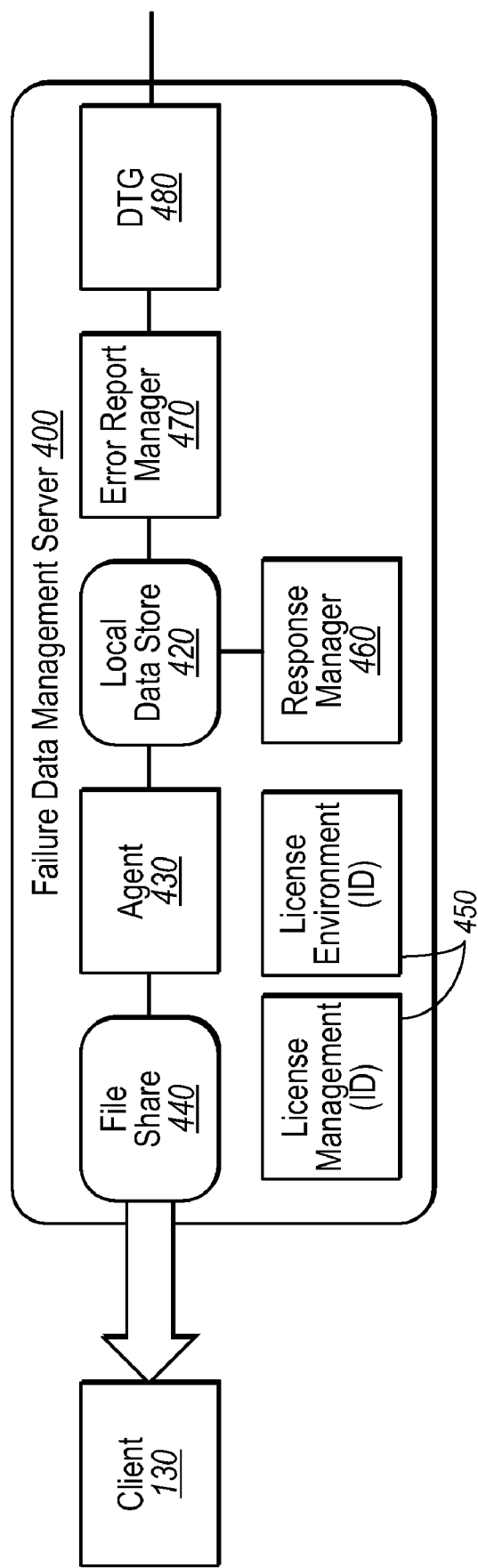

FIG. 3 shows an architectural overview of an example failure data management server 300. FIGS. 4A-4B illustrate logical data flows through an example failure data management server 400. In FIG. 4A, error reports from client 130 flow through failure data management server 400 to a support provider. In FIG. 4B, failure responses flow from a support provider through failure data management server 400 to client 130. Note that with respect to FIG. 4B, failure responses also may originate within failure data management server 400. Given the connection between FIGS. 3, 4A and 4B, these Figures will be discussed together, below.

Clients 130 write error reports to file share 340. The agent 330 works through the file share to gather error reports and perform some preprocessing, such as initial filtering based on license management and license enforcement 450 based on license ID 350, as well as putting the error reports into the local data store 320 as error reports 328. In some embodiments, local data store 320 may be implemented as a database, which is yet a further way the present invention may improve scalability. Agent 330 also manages the file share 340, including deletion of old reports and cabinet files, and forwarding of failure responses 327 to clients 130 as controlled by response manager 360.

As indicated above in connection with FIGS. 2 and 3, client 130 sends error reports to file share 440 of failure data management server 400. All error reports sent to file share 440 are stored in local data store 420 by agent 430. Agent 430 also captures additional data to store along with the error report in the form of a cabinet file. The state of each error report is stored in the local data store 420. Agent 430 collects error reports on-demand, in response to an event, or based on a specified schedule.

Event driven error report collection allows the agent to process errors as they are reported, preventing a build up of error reports that could bog down the agent and potentially the failure data management server as a whole. For example, the agent can watch for file system events on the file share 440 to detect when new errors have been dropped into the share or, as indicated below, periodically poll for new errors. Event driven error report collection is another way in which the present invention improves scalability.

Scheduled error report collection allows an administrator to specify a time interval. At the expiration of the time interval, the agent 430 traverses the file share 440 to collect any new error reports that may be available. The time interval supports a minimum value of 1 minute (100,000 reports a month is a rough average of 2+ per minute) and a maximum value of 1 day. In one example implementation, the default collection interval is 1 hour. Again, scheduled error report collection is one way to improve the present invention's scalability.

In this example implementation, the time interval is measured based on inactivity. In other words, each time the agent collects new error reports, for any reason, the time interval is reset and starts counting again. Scheduled error report collection is meant as a failsafe mechanism due to potential reliability issues in network file system events to prevent build up of errors, and to prevent the data in the local data store from getting stale. Scheduled error report collection is yet another way in which the present invention improves scalability.

Once the time interval of inactivity is reached, the agent 430 goes out to the file share 440 and imports the error reports into the local data store. Each of these imported error reports is marked as queued for filtering so that the error manager 470 knows which reports to process.

Agent 430 also collects new error reports on-demand. On-demand error report collection is triggered by other components in the failure data management server 400, such as, for example, the scheduler.

As part of the data collection process, agent 430 gathers and stores bucketing parameters for each error report. The parameters are represented in the file share by the directory structure. The following are possible error report types in an example implementation: user mode, bluescreen, setup, application compatibility, shutdown, generic, and simple. Among other things, generic reports may be used to report successful installations of application and operating system software, including updates. It should be recognized, however, that the invention is not limited to any particular error report types.

Error report manager 370 reads its configuration information from the local data store 320 and reads error reports 328 in order to send failure data to support providers 150. Error report manager 370 uses data transparency gateway 380 to send the failure data via transport 390. Data transparency gateway 380 not only sends the error reports, but also filters the error reports using transmission filter rules specified in transmission settings 322 to determine which error reports should be sent and collection filter rules in collection settings 322 to determine what error data should be included. As a result, some error reports will not be sent at all, and other error reports may have error data either removed or substituted. Data transparency gateway 380 also may provide an auditing capability of data passing through it in order to verify that the filtering rules are being followed. In certain embodiments, some or all of data transparency gateway 380 may be integrated within error report manager 370.

Failure responses 327, gathered from support providers 150 as public responses or from one or more other failure data management servers as custom public responses, also pass through the data transparency gateway 380 and error report manager 370 in order to be stored in the local data store 320. Custom private responses within failure responses 327 are created using the administration console interface 310 and administration console UI 110.

Error report manager 470 gathers error reports from the local data store 420 and sends them to support providers 150. As error reports are sent, error report manager 470 maintains state for those errors (queued for filtering, queued for transmission, unreported, reported, and retry) in the local data store 420 so that any report views are accurate.

As indicated above, data transparency gateway 480 (or error report manager 470 if data transparency gateway 480 is implemented within error report manager 470) determines what data has been authorized to be included in cabinet files sent with error reports. In this example implementation, file level is the lowest granularity available for data filtering from a cabinet file and the filtering is not based on the content of the files, just on the existence of those files within the cabinet file. Each individual file or set of files in a cabinet packet is either included or is deleted. As indicated above, for this example implementation, individual files within a cabinet packet are not parsed for filtered based on the content of that file.

When cabinet files are requested by the support providers 150, error report manager gathers the cabinet files from local data store 420.

The error manager stores responses in the local data store, making them available to the failure data management server 400 for processing or forwarding to clients. Responses are associated with a bucket when stored. Any responses gathered will be processed separately by the response manager. After processing a set of error reports, the error manager will extract any responses and place them in the local data store for the reported buckets. If there is a discrepancy, existing responses in the local data store are replaced with more recent responses received from the support providers. The response manager processes any response rules to determine which responses should be marked as associated and which should be marked as connected.

The response manager 360 invokes and runs all response rules configured through administration console UI 110. Agent 330 retrieves all approved responses (either manually approved or automatically approved) and forwards those responses to clients 130 through the file share 340. Request responses are governed by the collection settings as described in further detail below.

For purposes of the response manager, there are two high level types of responses: solution and request. A solution request is represented as a URL that can point the client to additional information, procedures to fix the problem, a downloadable update to fix the problem, or just reassurance that the problem is being investigated. A request response includes meta data that represents requests for additional data for the client to collect and include in a cabinet file, along with the standard cabinet file contents. Responses are communicated to clients through a status.txt file for each bucket in the file share. A single status.txt file can include none, one, or both types of responses.

A response is defined as a collection of fields, and a response can contain a combination of the different fields. The number and type of fields included in a response determine the overall type of a response.

A solution response includes one of the following two fields:
 Response—The valid values for this field, if present, are 1 (no solution) or a support provider hosted URL that points to a response page.
 UrlLaunch—This field contain a URL for a solution provided in a custom response.
The following fields are valid in request responses:
 fDoc—Asks the user for the current document that was being work on to be in included in the cabinet file.
 GetFile—File names, delimited by semi-colons, of all files to gather from the user's machine and include in the cabinet file.

GetFileVersion—File names, delimited by semi-colons, of all file version information to gather from the user's machine and include in the cabinet file.

WQL—WMI queries requested to be run and the results included in the cabinet file.

MemoryDump—If set to 1, then the heap has been requested to be include in the cabinet file.

RegKey—Registry keys requested to be gathered and included in the cabinet file.

RegTree—Similar to RegKey, except it grabs the entire registry tree for each semi-colon delimited entry.

Each of the foregoing fields maps directly to a field in the status.txt files that is written to the file share by the agent.

Each field in a response can be in one of four states: unprocessed, associated, connected, and published. The scope of a field's state is per bucket.

Unprocessed: When a response field gets added or updated in the local data store, the error manager should insert the value of the field and mark the field as unprocessed. Unprocessed means that a response field is queued for the response manager—waiting to be processed through the collection and response rules.

Associated: When a response field value does not pass all rules, the response manger marks the field as associated.

Connected: Once a response field has been processed automatically or manually selected, the response field moved into the connected state. Essentially, connected means that the agent should pick up the value for the field and include it in the status.txt file for the bucket that the response field is associated with. Only fields from a single response can be in the connected state at the same time.

Published: Once the agent has published the approved response field to the status.txt file for the bucket in the file share, the response field is marked as published.

The response manager owns all of the state transition from the unprocessed state. If a response field passes all application rules, then the state should move from unprocessed to connected (automatic approval). If any rules indicate that the response should not be automatically approved, then the response state should move from unprocessed to associated. The response manager also owns that state transitions from associated to connection. This transition occurs when an administration manually approves a response.

The agent owns the state transitions from connected to published. This always occurs automatically when the agent processes responses to send them back to client via the status.txt file.

When the error manager receives a response while processing error reports and a response already exists for an error bucket, the error manager should compare the current response to the existing response in the local data store. If the responses are different, the error manager should store the current response and mark those responses as unprocessed. This transition could occur from either the published or associated states. This transition to the unprocessed state means that the response manager would then reprocess the updated response fields according to the rules. An administrator also may remove a response through the administration console.

The response manager supports automatic processing of responses based on the following configuration settings:

Allow Automatic Connection: This rule is a Boolean on/off control for automatic publishing of any solution response that is not a survey.

Allow Automatic Connection of Surveys: This rule allows any solution response that is identified as a survey to be automatically connected. This setting is also Boolean.

If a response passes all automatic approval rules, then the response should be marked as connected. Once the response manager completes the state transitions and processing, the agent should be invoked to process all approved responses.

Request responses are governed by the collection options given below:

Allow Collection of Files: this rule is a Boolean on/off control for the collection of files. This option controls the fDoc, GetFile, and GetFileVesion response files. These three fields should be linked for all automatic state transitions.

Allow Collection of Registry Information: This rule is the Boolean on/off control for collection of registry information. The option controls the RegKey and RegTree response fields. These two files should be linked for all automatic state transitions.

Allow WMI Query: This rule is the Boolean on/off control for collection of information through a WMI query. The option controls the WQL response field.

Allow Collection of Memory Dump: This rule is the Boolean on/off control for collection of memory dump information. The option controls the Memory Dump response field.

A custom response consists of two types of data. The first type of data is the response URL and the second is custom data collection options. A custom response is associated with at least one error bucket and may be associated with more than one.

An administrator has the ability to specify a custom URL which will be presented to the end user in a dialog as a link. It is up to the administrator to create, test, and host the content at the provide URL.

The administration can display any content he or she wishes at the supplied URL. The content may be a procedure for a workaround to the problem, directions with a link to a download folder for an update, instructions and a link to a software update service, or even a survey.

Through the administration console interface 310, the administration console UI 110 establishes various setting for failure data management server 300, including collection settings 322, transmission settings 323, response settings 324, and server settings 326. Collection settings 322 govern user mode collection settings and requests for additional information. Additional information may include file information, registry information, WMI (Windows Management Interface) queries, and memory dumps. Collection settings 322 allow an administrator to determine what types of additional information may be included in an error report. Each type of additional information is stored in a separate file, and each of the separate files is compressed within a cabinet file. A cabinet file count may be set to limit the number of cabinet files persisted with user mode errors.

The collection of new error reports can be on-demand or may be triggered by writing an error report to the file share. To account for potential problems in receiving notifications that a new error report has been written to the file share, an interval for collecting any new error reports can be set as well. Each time the agent collects new error reports from the file share, the interval is reset. In this way, if problems occur in receiving a notification that a new error report has been written to the file share, no more than the collection interval will pass before the agent collects new error reports.

Transmission settings 323 govern user mode reports to the support provider, other report types, transmission filter rules, transmission scheduling, user mode cabinet file retention, and kernel mode cabinet file retention. User mode reports transmitted to the support provider may be limited to basic error reports (i.e., report error signatures only) or may include detailed error reports as requested by the support provider. As indicated above, specific types of additional information may be restricted from error reports in the collections settings. Other report types such as kernel mode reports, including system crashes, application compatibility, and shutdown error reports, and simple reports may be enabled or disabled through the transmission settings.

Transmission filter rules allow error reports for individual programs, modules, users, machines, and generic reports to be excluded or included from transmission. Transmission settings 323 allow an administrator to determine what types error reports may be sent. Like the collection interval, a transmission interval can be set to assure that the transmission of error reports occurs regularly. Transmission settings allow user mode cabinet files to be deleted once they have been sent to the support provider or retained in the local data store for a period of time, specified in months. Kernel mode cabinet files also can be retained in the local data store for a period of time, specified in months.

Response settings 324 identify a default response URL address if no response is connected and control whether surveys may be sent from support providers 150 to clients 130 to help in diagnosing failures. Responses that request additional information are also subject to the collection settings described above. If a response includes a request for additional information that is not allowed by the collection settings, the request for the additional information will be removed from the request before the response manager sends the response to the client.

Server settings 326 include the ability to check for software updates regularly, specifying the file share location, proxy server use, and authentication.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 5A:
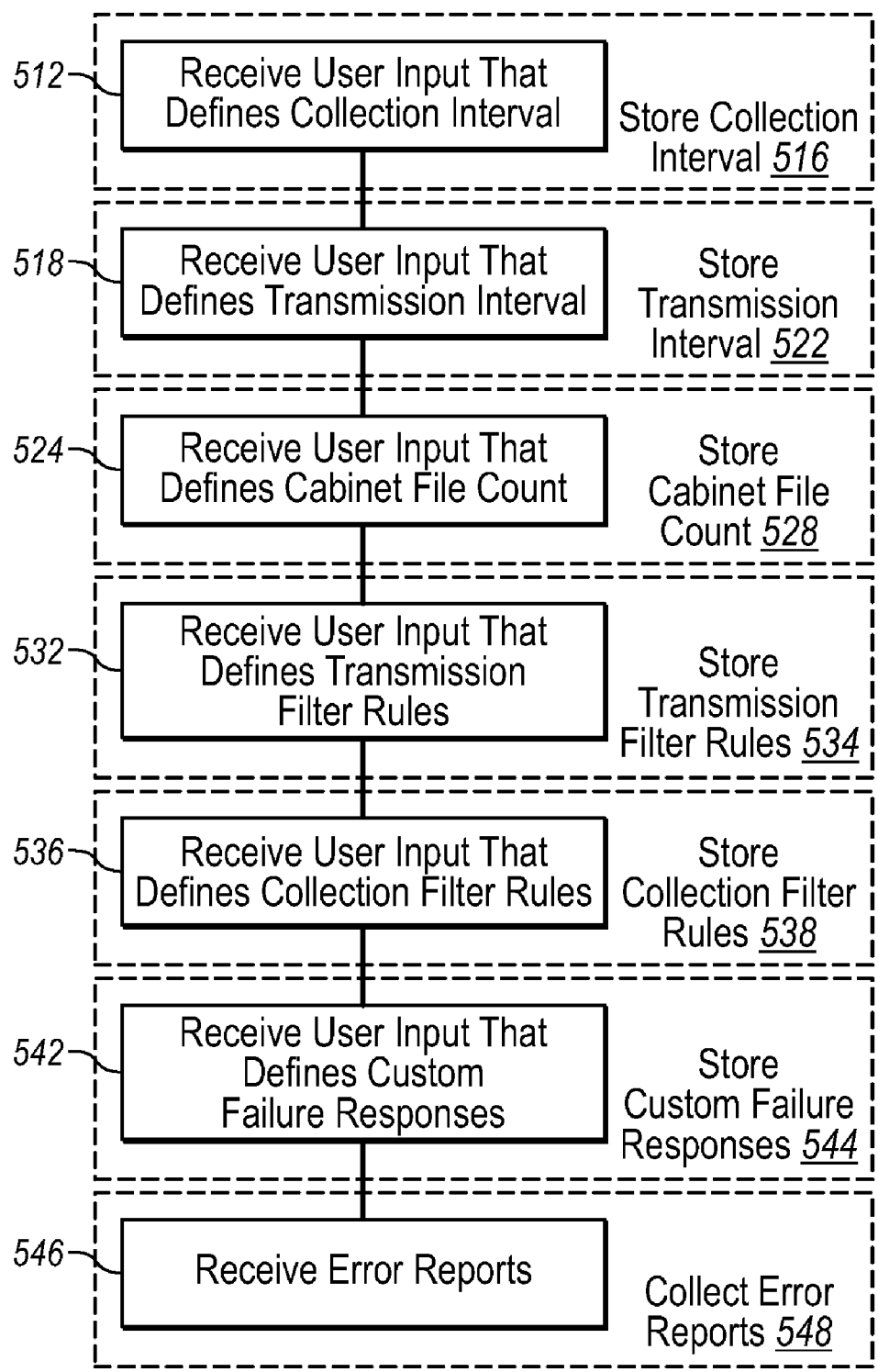
FIGS. 5A-5C show example acts and steps for methods of controlling failure data reporting in accordance with the present invention.
Figure 5B:
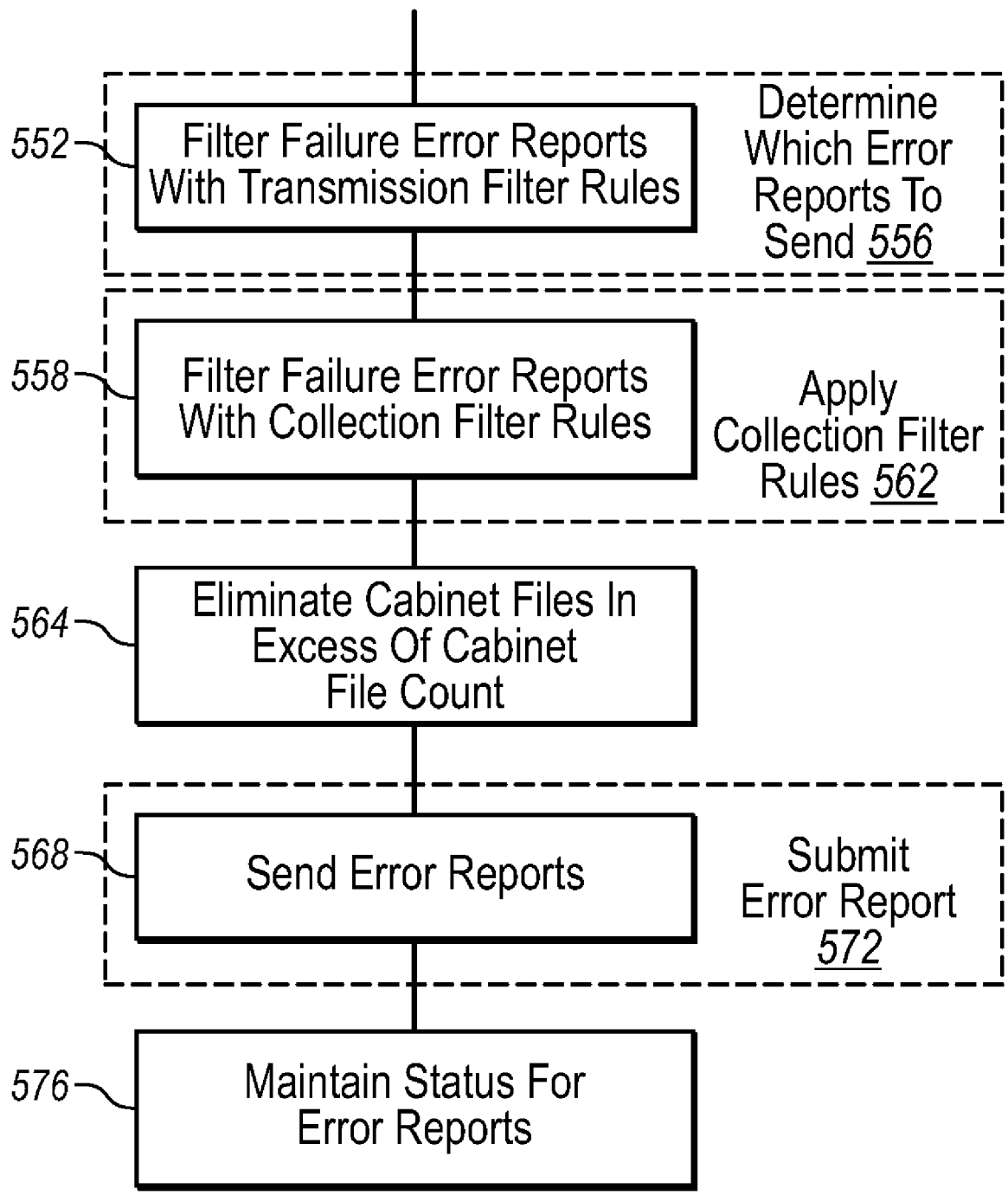
Figure 5C:
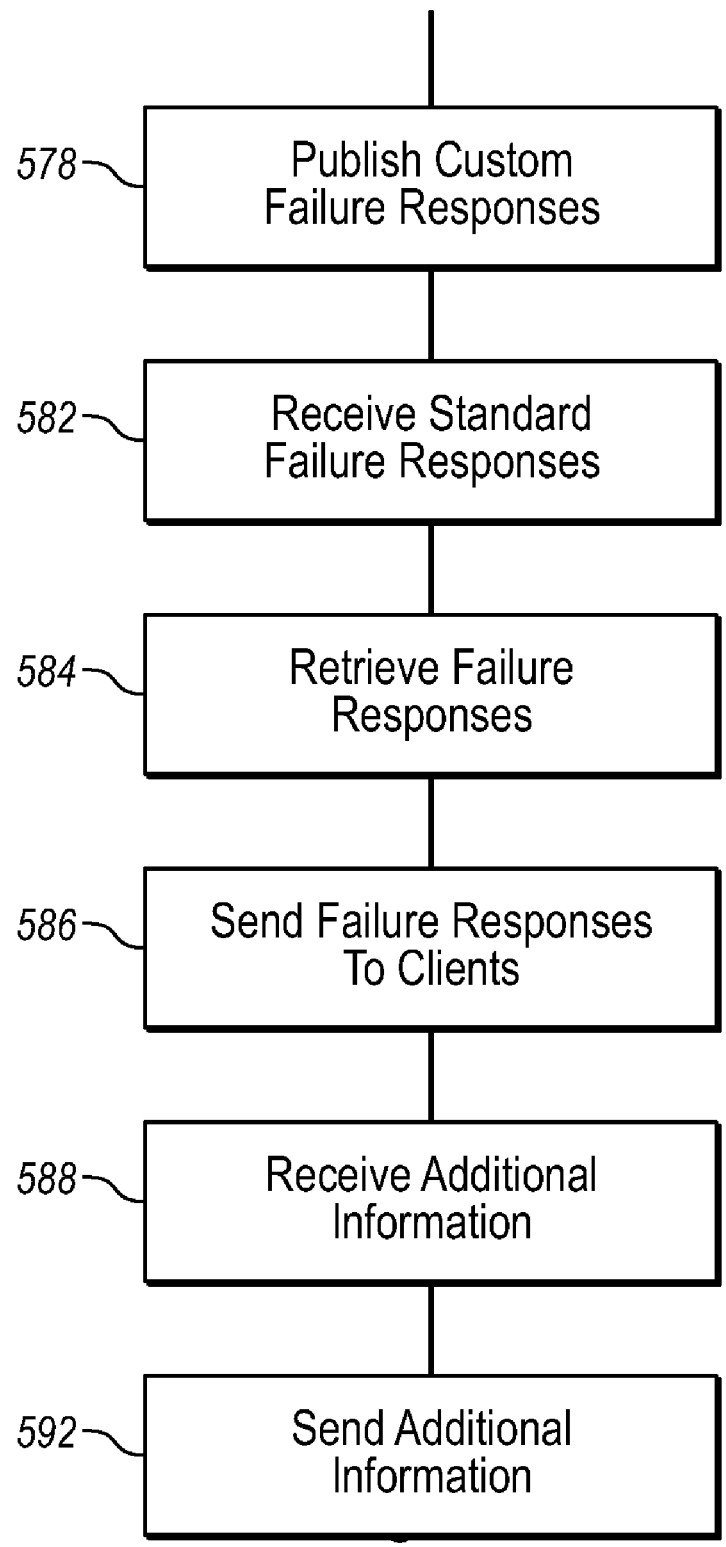

FIGS. 5A-5C show example acts and steps for methods of controlling failure data reporting in accordance with the present invention. A step for storing (516) a collection interval may comprise an act of receiving (512) user input that defines the collection interval. A step for storing (522) a transmission interval may include an act of receiving (518) user input that defines the transmission interval. A step for storing (528) a cabinet file count may include an act of receiving (524) user input that defined the cabinet file count.

A step for storing (534) one or more transmission filter rules may include an act of receiving (532) user input that defines the one or more transmission filter rules. A step for storing (538) one or more collection filter rules may include an act of receiving (536) user input that defines the one or more collection filter rules. A step for storing (542) one or more custom failure responses may include an act of receiving (538) user input that defines the one or ore custom failure responses. A step for collecting (548) one or ore error reports corresponding to one or more failures at one or more client may include an act of receiving (546) the one or more error reports.

A step for determining (556) which of the one or more error reports to send to the support provider based on the one or more transmission filter rules may include an act of filtering (552) one or more received error reports with the one or more transmission filter rules. A step for applying (562) one or more collection filter rules so that only failure data satisfying one or more collection filter rules remains within an error report may include an act of filtering (558) each error report to be sent to a support provider to remove any failure data that fails to satisfy the one or more collection filter rules. The method also may include an act of eliminating (564) any cabinet files in excess of the cabinet file count for a single failure signature.

A step for submitting (572) each error report that satisfies the one or more transmission filter rules, with failure data satisfying the one or more collection filter rules, to a support provider for analysis may include an act of sending (568) each error report that satisfies the one or more transmission filter rules, with failure data that satisfies the one or more collection filter rules, to the support provider for analysis. The method further may include acts of maintaining (576) status information for each of one or more received error reports, publishing (578) one or more failure responses to a support provider for user by one or more other failure data management server, receiving (582) one or more standard failure responses, retrieving (584) one or more failure responses, sending (586) the one or more failure responses to one or more clients, receiving (588) additional information requested in one or more requests, and sending (592) the additional information requested in the one or more requests to a support provider.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 6:
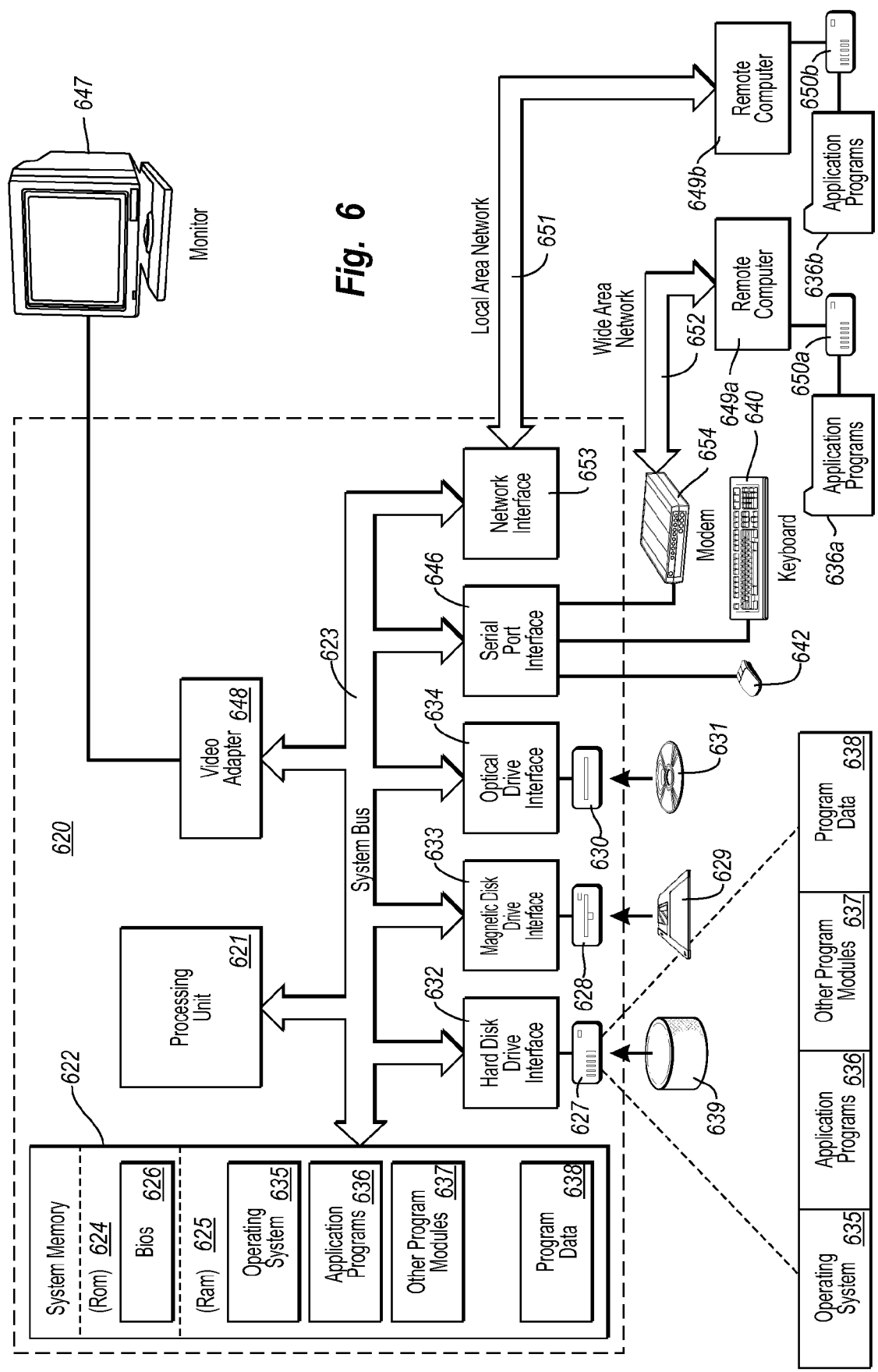
FIG. 6 illustrates an example system that provides a suitable operating environment for the present invention.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types.

Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an exemplary system for implementing the invention includes a general purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disk drive 628 for reading from or writing to a removable magnetic disk 629, and an optical disc drive 630 for reading from or writing to removable optical disc 631 such as a CD-ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile discs, Bernoulli cartridges, RAMs, ROMs, and the like.

Program code means comprising one or more program modules may be stored on the magnetic hard disk 639, removable magnetic disk 629, removable optical disc 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649a and 649b. Remote computers 649a and 649b may each be another personal computer, a server, a router, a network PC, a peer device or other common network node, and typically include many or all of the elements described above relative to the computer 620, although only memory storage devices 650a and 650b and their associated application programs 36a and 36b have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computing system configured for use in a network that includes a failure data management server connected to one or more clients and to one or more support providers, the one or more support providers receiving error reports containing failure data from the one or more clients and the one or more failure data management servers to use in determining one or more fixes for one or more failures occurring at the one or more clients, the computing system comprising:

one or more computer readable storage medium storing one or more executable instructions which, when executed, implement a method of controlling failure data reporting, and wherein the method comprises acts of:

receiving user input that defines one or more transmission filter rules to be met when sending an error report to a support provider;

receiving user input that defines one or more collection filter rules to be met when including failure data within an error report;

receiving one or more error reports corresponding to one or more failures at one or more clients;

filtering the one or more received error reports with the one or more transmission filter rules to determine which of the one or more received error reports to send to the support provider;

filtering each error report to be sent to the support provider to remove any failure data that fails to satisfy the one or more collection filter rules; and sending each error report that satisfies the one or more transmission filter rules, with failure data that satisfies the one or more collection filter rules, to the support provider for analysis.

2. The computing system recited in claim 1, wherein the one or more transmission filter rules comprise at least one of (i) an application name, (ii) a module name, (iii) a user name, (iv) a machine name, (v) a failure error type, or (vi) a generic event type and wherein the one or more collection filter rules allow for at least one of (i) a memory dump, (ii) application compatibility information, (iii) operating system version information, (iv) registry information, (v) hardware configuration information, or (vi) client file information.

3. The computing system recited in claim 1, wherein each error report comprises a failure signature that identifies a program location where the failure occurred and wherein the one or more transmission filter rules comprise an indicator to send only the failure signature for each error report that satisfies the one or more transmission filter rules.

4. The computing system recited in claim 1, wherein each error report comprises additional information, including at least one of (i) a memory dump, (ii) application compatibility information, (iii) operating system version information, (iv) registry information, (v) hardware configuration information, or (vi) client file information.

5. The computing system recited in claim 4, wherein the additional information is stored in one or more individual files, and wherein each of the one or more individual files is compressed within a cabinet file and wherein multiple error reports are received and correspond to a single failure signature, the method further comprising acts of:

receiving user input that defines a cabinet file count for the single failure signature; and eliminating any cabinet files in excess of the cabinet file count for the single failure signature.

6. The computing system recited in claim 1, wherein the method further includes acts of:

retrieving one or more failure responses corresponding to the one or more failures at the one or more clients; and sending the one or more failure responses to the one or more clients.

7. A method for controlling failure data reporting implemented within a network that includes a failure data management server connected to one or more clients and to one or more support providers, the one or more support providers receiving error reports containing failure data from the one or more clients and the one or more failure data management servers to use in determining one or more fixes for one or more failures occurring at the one or more clients, the method comprising:

storing one or more transmission filter rules containing one or more transmission criteria to be met when sending an error report to a support provider;

storing one or more collection filter rules containing one or more collection criteria to be met when including failure data within an error report;

collecting one or more error reports corresponding to one or more failures at one or more clients;

determining which of the one or more error reports to send to the support provider based on the one or more transmission filter rules;

for each error report to be sent to the support provider, applying the one or more collection filter rules so that only failure data satisfying the one or more collection filter rules remains within the error report; and submitting each error report that satisfies the one or more transmission filter rules, with failure data satisfying the one or more collection filter rules, to the support provider for analysis.

8. The method recited in claim 7, wherein the one or more transmission filter criteria comprise one or more allow lists, each containing (i) one or more application names, (ii) one or more module names, (iii) one or more user names, (iv) one or more machine names, (v) one or more failure error types, or (vi) one or more generic event types.

9. The method recited in claim 7, wherein the one or more content filter criteria allow for at least one of (i) a memory dump, (ii) application compatibility information, (iii) operating system version information, (iv) registry information, (v) hardware configuration information, or (vi) client file information.

10. The method recited in claim 7, wherein the method further comprises an act of receiving user input that defines an interval for collecting any new error reports.

11. The method recited in claim 7, wherein the method further comprises an act of receiving user input that defines an interval for transmitting new error reports to the support provider for analysis.

12. The method recited in claim 7, wherein the method further comprises acts of:

retrieving one or more failure responses corresponding to the one or more failures at the one or more clients; and sending the one or more failure responses to the one or more clients.

13. The method recited in claim 12, wherein the one or more failure responses comprise one or more requests for additional information.

14. The method recited in claim 13, wherein the method further comprises an act of receiving the additional information requested in the one or more requests from the one or more clients.

15. The method recited in claim 14, further comprising an act of sending the additional information requested in the one or more requests to the support provider.

16. The method recited in claim 13, wherein the additional information requested in the one or more requests comprises at least one of (i) a memory dump, (ii) application compatibility information, (iii) operating system version information, (iv) registry information, (v) hardware configuration information, or (vi) client file information.

17. The method recited in claim 12, wherein the one or more failure responses comprise one or more fixes for the one or more failures at the one or more clients.

18. The method recited in claim 17, wherein the one or more fixes comprise one or more instructions indicating how to prevent the one or more failures at the one or more clients from occurring.

19. The method recited in claim 17, wherein the one or more fixes comprise one or more software updates that prevent the one or more failures at the one or more clients from occurring.

20. The method recited in claim 7, wherein the applying the one or more collection filter rules so that only failure data satisfying the one or more collection filter rules remains within the error report comprises removing additional information that fails to satisfy the one or more collection filter rules.

21. A computing system for use in a network that includes a failure data management server connected to one or more clients and to one or more support providers, the one or more support providers receiving error reports containing failure data from the one or more clients and the one or more failure data management servers to use in determining one or more fixes for one or more failures occurring at the one or more clients, the computing system comprising:

one or more computer readable storage media having stored computer executable instructions that implement a method of controlling failure data reporting, wherein the method comprises:

storing one or more transmission filter rules containing one or more transmission criteria to be met when sending an error report to a support provider;

storing one or more collection filter rules containing one or more collection criteria to be met when including failure data within an error report;

collecting one or more error reports corresponding to one or more failures at one or more clients;

determining which of the one or more error reports to send to the support provider based on the one or more transmission filter rules;

for each error report to be sent to the support provider, applying the one or more collection filter rules so that only failure data satisfying the one or more collection filter rules remains within the error report; and submitting each error report that satisfies the one or more transmission filter rules, with failure data satisfying the one or more collection filter rules, to the support provider for analysis.

* * * * *